No. 673,009. Patented Apr. 30, 1901.
N. POULSON.
WINDOW PANE OR GLASS PANEL.
(Application filed June 7, 1899.)

(Model.)

Witnesses:
C. L. Belcher
Wm. H. Capel

Inventor
Niels Poulson
By
Attorney

UNITED STATES PATENT OFFICE.

NIELS POULSON, OF BROOKLYN, NEW YORK.

WINDOW-PANE OR GLASS PANEL.

SPECIFICATION forming part of Letters Patent No. 673,009, dated April 30, 1901.

Application filed June 7, 1899. Serial No. 719,700. (Model.)

*To all whom it may concern:*

Be it known that I, NIELS POULSON, a citizen of the United States, and a resident of Brooklyn, in the county of Kings and State of New York, have invented certain new and useful Improvements in Window-Panes or Glass Panels, of which the following is a specification.

This invention relates to glass manufactures, and will be described with especial reference to window panes or panels.

The main object of the invention is to construct a pane, panel, or other object from glass or other vitreous material which shall be reinforced by metal and which will be far more durable than if constructed of vitreous material alone.

Another object is to form a glass panel or object of this sort in a manner such that the metallic part can be made in any desired pattern and the vitreous portion of any desired color.

With these objects in view the invention consists in the construction and formation of parts, as hereinafter fully described and claimed.

Figure 1:
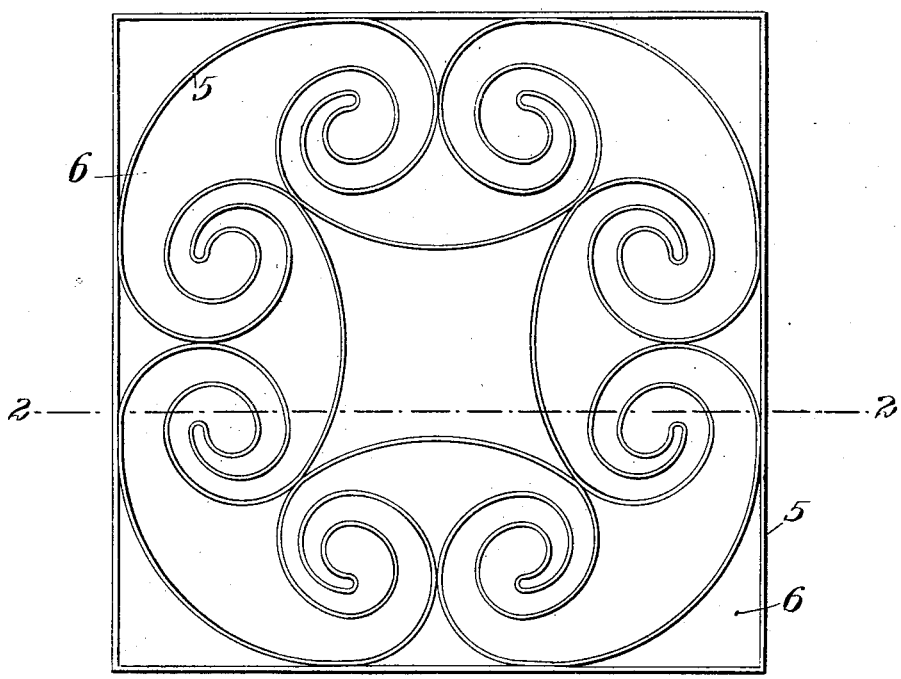
Figure 2:
Figure 3:
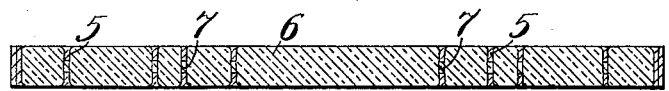

In the accompanying drawings, which form a part of this specification, Figure 1 represents in plan a window pane or panel embodying my invention, the design of said panel being arbitrarily chosen simply to form a basis for the disclosure of the invention. Fig. 2 represents a section through said panel, taken on the line 2 2. Fig. 3 represents a like section through a similar panel, wherein the metallic portion is modified and the glass portion also.

In the drawings, 5 refers to the metallic portion or frame, which may be of any desired design, and 6 to the vitreous portion, which may be of porcelain or glass and which fills in the spaces between the parts of the metallic frame or pattern.

The panel shown is formed, preferably, by spreading a sheet of molten or plastic glass upon a suitable table and then pressing the metallic frame down into the glass. The panel represented in Figs. 1 and 2 was formed in this way. In that case the metallic frame is not pressed completely through the glass nor does the glass extend to the top of the frame. The glass adheres to the frame and is rounded over next to the parts thereof, thereby producing a pleasing iridescent effect.

If desired, the frame may be pressed completely through the glass, as seen in Fig. 3, and the glass may be made to protrude above the frame. The glass may also be made to extend beyond the frame on both sides at the outset and then be ground down flush with the frame, as represented in Fig. 3. In this form both sides may be polished.

Brass serves very well as a metal from which to make the frame; but it may be made from any other metal whose point of fusion is higher than that of the plastic glass.

The frame may be roughened or slightly flanged at its edges, as indicated in Fig. 3, or it may have perforations in the parts thereof, as indicated at 7 in Fig. 3. Any of these devices will serve to insure a firm union between the glass and the frame.

A panel constructed after the invention as set forth may be employed as a window-pane or in any place where an ornamental panel is desired, and its pattern and formation may be varied without departing from the invention.

The invention claimed is—

A new article of manufacture consisting of an ornamental integral panel of glass or other vitreous substance having a tracery or design executed in metal strips on edge, and surrounded by a metal frame, both protruding at one side of said panel, the glass being rounded at the edge near the metal and adhering to the frame and tracery.

Signed at New York, in the county of New York and State of New York, this 19th day of May, A. D. 1899.

NIELS POULSON.

Witnesses:
 DELBERT H. DECKER,
 WM. H. CAPEL.